United States Patent [19]

Shulman

[11] Patent Number: 5,580,378
[45] Date of Patent: Dec. 3, 1996

[54] LIGHTWEIGHT CEMENTITIOUS COMPOSITIONS AND METHODS OF THEIR PRODUCTION AND USE

[76] Inventor: David M. Shulman, 7445 S. Milwaukee Way, Littleton, Colo. 80122

[21] Appl. No.: 358,858

[22] Filed: Dec. 19, 1994

[51] Int. Cl.$^6$ .................................................. C04B 24/00
[52] U.S. Cl. .................... 106/677; 106/672; 106/679; 106/676; 106/708; 106/724; 106/795; 106/802; 106/823; 106/18.3; 106/717; 106/711; 106/815; 524/2; 524/650
[58] Field of Search .................... 106/677, 672, 106/676, 708, 724, 711, 792, 823, 815, 18.3, 679, 696, 795, 802, 717; 428/402; 264/DIG. 7; 524/2, 650

[56] References Cited

U.S. PATENT DOCUMENTS

| | | | |
|---|---|---|---|
| 4,047,962 | 9/1977 | Copeland | 106/676 |
| 4,104,077 | 8/1978 | Kobayashi | 106/672 |
| 4,201,457 | 7/1980 | Dodson et al. . | |
| 4,306,395 | 12/1981 | Carpenter | 264/DIG. 7 |
| 4,704,415 | 11/1987 | Pierce et al. . | |
| 4,801,404 | 1/1989 | Dietrich et al. | 106/18.3 |
| 4,828,619 | 5/1989 | Matshushita et al. . | |
| 4,905,439 | 3/1990 | Filteau | 106/672 |
| 4,906,298 | 3/1990 | Natsuume et al. . | |
| 4,992,102 | 2/1991 | Barbour . | |
| 5,114,487 | 5/1992 | Gartshore . | |
| 5,207,830 | 5/1993 | Cowan . | |
| 5,266,111 | 11/1993 | Barbour . | |
| 5,269,975 | 12/1993 | Noakes | 106/705 |
| 5,352,288 | 10/1994 | Mallow . | |
| 5,352,390 | 10/1994 | Hilton et al. | 428/402 |

FOREIGN PATENT DOCUMENTS 52-593A29   11/1976   Japan .

OTHER PUBLICATIONS

Kosmatka et al., "Design & Control of Concrete Mixtures," Thirteenth edition, PCA, 1988 p. 64. (no month).

*Primary Examiner*—Karl Group
*Assistant Examiner*—Michael Marcheschi

[57] ABSTRACT

An improved lightweight cementitious product made up of an aqueous cementitious mixture that can incorporate fly ash, portland cement, sand, lime, and the weight saving component, which is micronized polystyrene particles having particle sizes in the range of 50 to 2000 microns. The final mix can be poured into molded products such as foundation walls, roof tiles, bricks and the like. The product can also be used as a mason's mortar, a plaster, a stucco or a texture.

31 Claims, No Drawings

5,580,378

LIGHTWEIGHT CEMENTITIOUS COMPOSITIONS AND METHODS OF THEIR PRODUCTION AND USE

FIELD OF THE INVENTION

The present invention provides novel compositions, methods of their use and methods of their manufacture, such compositions generally useful as agents in the construction and building trades. More specifically, the compounds of the present invention can be used in construction and building applications that benefit from a relatively lightweight pourable cementitious material that has good insulating and vermin resistance properties. At the present time, there is a need in the area of construction and building for such agents.

BACKGROUND OF THE INVENTION

In the field of preparation and use of lightweight cementitious materials, such as so-called lightweight concrete, the materials that have been available to the trades up until now have generally required the addition of various constituents to achieve a strong but lightweight concrete mass that has a high homogeneity of constituents and which is uniformly bonded throughout the mass. Of the methods known to the inventor, there have been several patents issued relating to the inclusion of expanded polystyrene beads of an average bead size of about 20 mm diameter (about 20,000 microns) that are expanded by various heating methods either before the beads are introduced into the concrete mixture, or expanded after they have been added to the concrete mixture. It is an object of this invention to provide for a pourable, lightweight cementitious mixture that does not rely on expanded polystyrene for weight saving properties and strength. It is another object of the present invention to provide for a pourable, lightweight cementitious mixture that can be used in the construction of molded roofing tiles. It is yet another object of the present invention to provide for a pourable, lightweight cementitious mixture that can be used in the construction of laminated building foundations. It is yet another object of the present invention to provide for a pourable, lightweight cementitious mixture that resists insect infestation and deterioration.

The present invention achieves these objectives through the use of micronized particulates of polystyrene in a cementitious mixture composition.

SUMMARY OF THE INVENTION

The invention comprises lightweight cementitious compositions that yield building materials having a density of 90 to 145 lb/ft$^3$, comprising from 40 to 99% by volume of an aqueous cementitious mixture and from 1 to 60% by volume of micronized polystyrene foam particles. More preferably, the aqueous cementitious mixture is present in a range of from 50 to 60% by volume and the micronized polystryrene foam particles are present in a range of from 40 to 50% by volume.

DESCRIPTION OF THE PREFERRED EMBODIMENTS

The term "aqueous cementitious mixture" refers to any of a number of compositions comprising water, a cement material, and one or more fillers or adjuvants that form a slurry that hardens upon curing. Cement materials include hydraulic cements, gypsum, lime, and the like. Adjuvants and fillers include sand, clay, fly ash, aggregate, air entrainment agents, colorant agents and so forth.

The term "cement" is used herein in the sense of the material that bonds a concrete or other monolithic product, not to the final product itself. Hydraulic cement undergoes a hydration reaction in the presence of a sufficient quantity of water that produces the final hardened product. The following are some typical hydration reactions:

$$Ca_3Al_2O_6 + 6\ H_2O \rightarrow Ca_3Al2(OH)_{12};$$
$$Ca_2SiO_4 + x\ H_2O \rightarrow Ca_2Si)_4\text{-}x\ H_2O;$$
$$Ca_3SiO_5 + (x+1)H_2O \rightarrow Ca_2SiO_4\text{-}x\ H_2O + Ca(OH)_2$$

The most preferred hydraulic cement for use in the invention is portland cement. Various embodiments of the invention call for the addition of lime (calcium oxide) which is itself also a hydraulic cement.

Micronized polymeric particles comprise the weight saving component of the present invention, and can be polystyrene, polyester, polyethylene, polypropylene, acrylic, polyacrylamide, polyacrylimide, mixed imideamides arylamides, arylimides and the like. Also within the contemplation of the invention is the use of saw dust and wood pulp. The most preferred material is polystyrene. Micronized polystyrene foam particulates are the result of a process of shredding virgin polystyrene foam, and give the final product its lightweight characteristics. The most preferred form of micronized polystyrene foam particulates is made up of virgin polystyrene foam of approximately 1 lb/ft$^3$ density that has been treated with a borate. The borate acts as a potent insect repellant, including for termite infestation. Such foam block is then shredded to provide the micronized particles which have substantially irregular surfaces. A particularly well suited method of shredding is by running an electrified fine gauge wire through solid blocks of this foam, according to methods well known to those of ordinary skill in cutting and fabricating such polystyrene foam blocks. This type of product is also generally available as a waste by-product ("fines") at facilities that cut virgin polystyrene foam block. This process produces micronized foam particulates that can be characterized by sieve analysis in general conformance with ASTM C 136, entitled "Sieve Analysis of Fine and Coarse Aggregates". Such method of analysis is suitable for particles of from 50 to 5,000 microns in size. The micronized foam particles preferably have an average diameter of approximately 1 to 5000 microns, more preferably have an average diameter of approximately 50 to 2000 microns, and even more preferably have an average diameter of approximately 600 to 1200 microns. A typical sample yielded the following sieve analysis:

| Sieve Size | Sieve Opening (in microns) | Polystyrene % Passing |
| --- | --- | --- |
| No. 4 | 4760 | 100 |
| No. 8 | 2380 | 99 |
| No. 10 | 2000 | 99 |
| No. 16 | 1260 | 80 |
| No. 30 | 590 | 34 |
| No. 50 | 297 | 8 |
| No. 100 | 149 | 2 |
| No. 200 | 74 | 1 |

From this analysis, it can be seen that the micronized polystyrene foam particulates preferred in the invention can be characterized as a coarse to moderately coarse powder, as those terms are used in rheology, having a median particle size of approximately 800 microns. Micronized foam of this type is available from the R-Control Co. of Denver, Colo., and other major cities.

The most preferred cement for use in the compositions of the invention is Portland cement type I.

Fly ash can be used as a partial replacement for portland cement in concrete construction, and it is generally accepted that the proportion of portland cement replaced by the usual fly ash should not exceed about 20% to avoid significant reduction in the compressive strength or the resultant concrete. Fly ash components of the cementitious mixtures of the invention can be either C-type or F-type fly ash. Fly ash is the very finely divided ash produced by the combustion of anthracite and bituminous coal in large industrial coal-fired boilers, especially for the steam generation of electricity, that is suspended in the flue gases from such boilers and is separated therefrom by means such as electrostatic precipitation. This fly ash is an extremely finely divided material generally in the form of spherical bead-like particles, with at least 70% by weight passing a 200 mesh sieve and has a generally glassy state, resulting from fusion or sintering during combustion. As recognized in the American Society of Testing Materials (ATM) specification designation C618-85 entitled "Fly Ash and Raw or Calcined Natural Pozzolan for Use as a Mineral Admixture in Portland Cement Concrete", fly ash is subdivided into two distinct classifications; namely, Class F and Class C. The definitions of these two classes are as follows: "Class F-Fly ash normally produced from burning antharacite or bituminous coal that meets the applicable requirements for this class as given herein. This class fly ash has pozzolanic properties. Class C-Fly ash normally produced from lignite or subbituminous coal that meets the applicable requirements for this class as given herein. This class of fly ash, in addition to having pozzolanic properties, also has some cementitious properties. Some Class C flyashes may contain lime contents higher than 10%." The reference to "pozzalanic properties" refers to the capability of certain mixtures, which are not in themselves cementitious, of undergoing a cementitious reaction when mixed with lime (calcium oxide) in the presence of water. Class F Fly-ashes can have from 4 to 9% calcium oxide contents, while Class C Fly-ashes can have from 30 to 60% calcium oxide contents. For this reason, Class C fly ash possesses direct cementitious properties as well as pozzolanic properties. Fly ash is readily available from local building products outlets. Fly ash that has been de-limed, which is called for in several embodiments of the cementitious compositions of the present invention, is also readily commercially available from a variety of local sources.

In the following examples, measurements, unless noted otherwise, are given as parts of volume to volume measures, abbreviated as v/v.

The presence of an air entraining agent helps to create air cells or voids in a batch of concrete, which can help to maintain good workability of fresh concrete and also improve the durability to freezing and thawing of hardened concrete. Air Entrainment® is the trademark of a proprietary high grade tree sap preparation that is preferentially included in some embodiments of the present invention, being used to entrap small air bubbles in cementitious compositions when desired. Other air entrainment agents include anionic surfactants such as polyoxyethylene alkyl ether sulfates or polyoxyethylene alkly phenyl ether sulfates or salts thereof, polyoxyethylene alkyl ether phosphates or polyoxyethylene alklyl phenyl ether phosphates or salts thereof, alkylbenzenesulfonic acids or salts thereof, alpha-olefinic-sulfonic acids or salts thereof, fatty acids or salts thereof, polyoxyethylene polyalcohol fatty acid esters, polyethylene glycol fatty acid esters, polyoxyethylene pentaerythryritol fatty acid esters and polyoxyethylene sorbitan fatty acid esters and the fatty acids or salts thereof.

Sand is frequently used to expand the volume of cementitious mixtures. Sand used in the cementitious mixtures of the present invention include play sand whether from beach or river sources, and silica sand. Clay is a suitable alternative for sand in the mixtures of the invention.

As a means of reinforcing the final cured product, reinforcement fibers can be added to the cementitious mixtures of the invention. Such fibers act as reinforcing components, having a large aspect ratio, that is, their length/diameter ratio is high, so that a load is transferred across potential points of fracture. Typical preferred materials are fiberglass strands of approximately one to one and three fourths inches in length, although any material can be used that has a higher Young's modulus than the matrix of the cementitious material. Another preferred fiber are commercially available from the Fibermesh company of Chatanooga, Tenn., and are comprised of polypropylene fiber. In those embodiments of the invention that include the use of reinforcing fibers, the final molded product often displays a hair-like external appearance. Such extraneous fiber hairs can be burned off with a suitable torch.

Densities of hardened final products using the compositions of the present invention can vary from 60 to 115 lb/ft$^3$ and more preferably from 70 to 90 lb/ft$^3$, with many products being about 80 lb/ft$^3$.

The compositions of the invention are well suited to the fabrication of molded construction materials, especially roofing tiles and foundation walls. The compositions are easier to pour than regular weight mixtures and exhibit greater strength. The compositions can be readily cast into molds according to methods well known to those of skill in the an for roofing tiles in virtually any three dimensional configuration desired, including configurations having certain topical textures such as having the appearance of wooden shakes, slate shingles or smooth faced ceramic tiles. A typical shingle can have approximate dimensions of ten inches in width by seventeen inches in length by one and three quarters inches in thickness. In the molding of roofing materials, the addition of an air entrainment agent makes the final product more water resistant.

When foundation walls are poured using the lightweight cementitious compositions of the invention, the walls can be taken above grade due to the lighter weight. Ordinarily, the lower part of the foundation wall has a tendency to blow outwards under the sheer weight of the concrete mixture, but the lighter weight of the compositions of the invention tend to lessen the chances of this happening. Foundation walls prepared using these compositions can readily take conventional fasteners used in conventional foundation wall construction. A particularly preferred type of foundation wall construction calls for the use of foam plastic walls to form a sandwich containing the poured lightweight concrete. After hardening, the foam walls are left intact to add significantly to the insulation properties of the foundation walls. Such walls can be made of extruded polystyrenes or the like, and frequently are available to contractors in preformed wall and corner units that snap or clip together, according to methods well known to those in the construction trades.

Additionally, the cementitious compositions of the invention can be used as a stucco or as a plaster, being applied by any means well known to those of ordinary skill in those trades; as a wall board, of the sandwich type of construction wherein the hardened material is sandwiched by suitably strong paper or other construction material; as pavers for sidewalks, driveways and the like; as a pour material for sidewalks, driveways and the like; as a monolithic pour material for floors of buildings; as chimney stacks or smoke stacks; as bricks; as fire bricks for fireplaces and the like; as roof pavers; as monolithic pour material for radiant heat floor systems; as blocks for landscape retaining walls; as prestressed concrete wall systems; as flit-up wall systems, i.e. where a wall component as poured on site and then tilted up when hardened; as mason's mortar; as a spray-on texture for wall surfaces; and as a spray-on pipe insulation.

The most preferred compositions of the invention are any or all of those specifically set forth in the following examples. These compositions are not, however, to be construed as forming the only genus that is considered as the invention, and any combination of the compositions' components may itself form a genus. The following examples further illustrate details for the preparation of the compositions of the present invention. Those skilled in the art will readily understand that known variations of the conditions and processes of the following preparative procedures can be used to prepare these compositions.

In each of the following examples, the mixes are prepared at a temperature of approximately 40° F. or above. Strength tests were conducted according to the ASTM C 39 protocol, the text of which is incorporated herein by reference. Fire tests are conducted according to ASTM E 108 and ASTM C 518 and the ICBO Class A Fire Test, the text of which is incorporated herein by reference.

EXAMPLE 1

A cementitious composition was prepared by mixing the following components under the following conditions:

4 parts v/v of F-type fly ash that has been de-limed.

4 parts v/v lime.

9 parts v/v Portland cement.

6 parts v/v play sand.

24 parts v/v micronized polystyrene foam particles.

The above ingredients were dry mixed for seven minutes, and 9 pans of water v/v were added to the mix. 0.001 parts v/v Air Entrainment® brand of Air entraining resin was then added according to the manufacturer's directions. After drying, the resulting material yielded the following strength tests, in psi measured at the indicated time intervals post drying:

8 days: 760 psi 28 days: 1050 psi 56 days: 1230 psi

EXAMPLE 2

A cementitious composition is prepared by mixing the following components under the following conditions:

4 parts v/v of C-type fly ash that has been de-limed.

4 parts v/v lime.

9 parts v/v Portland cement.

6 parts v/v play sand.

24 parts v/v micronized polystyrene foam particles.

The above ingredients are dry mixed for seven minutes, and 9 parts of water v/v are added to the mix. 0.00 1 parts v/v Air Entrainment® brand of Air entraining resin is then added according to the manufacturer's directions.

EXAMPLE 3

A cementitious composition is prepared by mixing the following components under the following conditions:

4 parts v/v of C-type fly ash that has been de-limed.

4 parts v/v lime.

9 parts v/v Portland cement.

6 parts v/v play sand.

24 parts v/v micronized polystyrene foam particles.

The above ingredients are dry mixed for seven minutes, and 10 parts of water v/v are added to the mix. 0.001 parts v/v Air Entrainment® brand of Air entraining resin is then added according to the manufacturer's directions.

EXAMPLE 4

A cementitious composition is prepared by mixing the following components under the following conditions:

4 parts v/v of F-type fly ash.

9 parts v/v Portland cement.

6 parts v/v play sand.

24 parts v/v micronized polystyrene foam particles.

The above ingredients are dry mixed for seven minutes, and 9 parts of water v/v are added to the mix. 0.001 parts v/v Air Entrainment® brand of Air entraining resin is then added according to the manufacturer's directions.

EXAMPLE 5

A cementitious composition is prepared by mixing the following components under the following conditions:

4 pans v/v of C-type fly ash.

9 pans v/v Portland cement.

6 parts v/v play sand.

24 parts v/v micronized polystyrene foam particles.

The above ingredients are dry mixed for seven minutes, and 9 parts of water v/v are added to the mix. 0.001 parts v/v Air Entrainment® brand of Air entraining resin is then added according to the manufacturer's directions.

EXAMPLE 6

A cementitious composition was prepared by mixing the following components under the following conditions:

4 parts v/v of F-type fly ash.

9 parts v/v Portland cement.

6 parts v/v play sand.

24 parts v/v micronized polystyrene foam particles.

1 part v/v fiberglas strands.

The above ingredients were dry mixed for five minutes, and 9 parts of water v/v were added to the mix. 0.001 parts v/v Air Entrainment® brand of Air entraining resin was then added according to the manufacturer's directions. After drying, the resulting material yielded the following strength tests, in psi measured at the indicated time intervals post drying:

6 days: 1150 psi 28 days: 1710 psi

Absorption %, UBC Standard 15-5 Roof Tile Test: 19.5%

Fire Brand Test Passed: 2000° C.

EXAMPLE 7

A cementitious composition was prepared by mixing the following components under the following conditions:

0.5 lb. of F-type fly ash.

20.2 lb. of Portland cement.

46 lb. of play sand.

30 lb. of 0.75 inch aggregate rock 0.5 lb. micronized polystyrene foam particles.

The above ingredients were dry mixed for five minutes, and 14.5 lbs of water were added to the mix. After drying, the resulting material yielded the following strength tests, in psi measured at the indicated time intervals post drying:

7 days: 1820 psi
28 days: 2760 psi
56 days: 2660 psi

EXAMPLE 8

A cementitious composition was prepared by mixing the following components under the following conditions:

0.75 parts v/v of C-type fly ash.
1 part v/v of Portland cement.
1 part v/v of silica sand.
3 parts v/v of micronized polystyrene foam particles.

The above ingredients were dry mixed for seven minutes, and 9 parts of water were added to the mix.

EXAMPLE 9

A cementitious composition was prepared by mixing the following components under the following conditions:

0.25 parts v/v of C-type fly ash that has been de-limed.
0.5 v/v parts lime.
1 part v/v of Portland cement.
1 part v/v clay aggregate
4 parts v/v of polystyrene foam beads.

The above ingredients were dry mixed for seven minutes, and 1 parts of water were added to the mix.

EXAMPLE 10

A cementitious composition was prepared by mixing the following components under the following conditions:

0.25 parts v/v C-type fly ash that has been de-limed.
0.5 parts v/v lime.
1 part v/v Portland cement.
1 part v/v silica sand.
4 parts v/v of polystyrene beads.

The above ingredients were dry mixed for seven minutes and 1 part v/v water added to the mix.

EXAMPLE 11

A cementitious composition was prepared by mixing the following components under the following conditions:

0.25 parts v/v of C-type fly ash that has been de-limed.
1 part v/v of lime.
1 part v/v of Portland cement.
1 part v/v of clay aggregate.
4 parts v/v of micronized polystyrene foam particles.

The above ingredients were dry mixed for seven minutes, and 1 part v/v of water were added to the mix.

EXAMPLE 12

A cementitious composition was prepared by mixing the following components under the following conditions:

0.25 parts v/v C-Type fly ash that has been de-limed.
1 part v/v Portland cement.
0.5 parts lime.
1 part v/v silica sand.
4 parts v/v polystyrene foam beads.

The above ingredients were dry mixed for seven minutes, and 1 part v/v of water were added to the mix. After drying, the resulting material yielded the following strength tests, in psi measured at the indicated time interval post drying:

28 days: 610 psi

EXAMPLE 13

A cementitious composition was prepared by mixing the following components under the following conditions:

0.25 parts v/v C-type fly ash that has been delimed.
1 part v/v Portland cement.
0.5 parts v/v of lime.
1 part v/v of play sand.
4 parts v/v of polystyrene foam beads.

The above ingredients were dry mixed for seven minutes, and 1 part v/v of water were added to the mix.

EXAMPLE 14

A cementitious composition was prepared by mixing the following components under the following conditions:

4 parts v/v of C-type fly ash that has been de-limed.
6 parts v/v of Portland cement.
3 parts v/v of lime.
6 parts v/v of play sand.
24 parts v/v of micronized polystyrene foam particles.

The above ingredients were dry mixed for seven minutes, and 8 pans v/v of water were added to the mix. After drying, the resulting material yielded the following strength tests, in psi measured at the indicated time intervals post drying:

8 days: 250 psi
30 days: 320 psi
56 days: 350 psi

EXAMPLE 15

A cementitious composition was prepared by mixing the following components under the following conditions:

3 parts v/v of C-type fly ash that has been de-limed.
9 parts v/v of Portland cement.
4.5 parts v/v of lime.
12 parts v/v silica sand.
3 parts v/v calcium carbonate.

The above ingredients were dry mixed for seven minutes, and 10 parts v/v of water were added to the mix. After drying, the resulting material yielded the following strength tests, in psi measured at the indicated time intervals post drying:

8 days: 180 psi

EXAMPLE 16

A cementitious composition was prepared by mixing the following components under the following conditions:

4 parts v/v of C-type fly ash that has been de-limed.
12 parts v/v of Portland cement.
4.5 parts v/v of lime.
6 parts v/v play sand.
28 parts v/v of micronized polystyrene foam particles.

The above ingredients were dry mixed for five minutes, and 10.5 parts v/v of water were added to the mix. After drying, the resulting material yielded the following strength tests, in psi measured at the indicated time intervals post drying:

7 days: 1230 psi
21 days: 1390 psi
29 days: 1670 psi

EXAMPLE 17

A cementitious composition was prepared by mixing the following components under the following conditions:

15 parts v/v of F-type fly ash that has been de-limed.
21 parts v/v of Portland cement.
8 parts v/v of lime.
18 parts v/v play sand.
24 parts v/v of micronized polystyrene foam particles.

The above ingredients were dry mixed for five minutes, and 13 parts v/v of water were added to the mix. After drying, the resulting material. yielded the following strength tests, in psi measured at the indicated time intervals post drying:

5 days: 700 psi
15 days: 760 psi
28 days: 900 psi

EXAMPLE 18

A cementitious composition was prepared by mixing the following components under the following conditions:

11 parts v/v of C-type fly ash that has been de-limed.
20 parts v/v of Portland cement.
11 parts v/v of lime.
12 parts v/v play sand.
0.6 parts v/v of micronized polystyrene foam particles.

The above ingredients were dry mixed for five minutes, and 20 parts v/v of water were added to the mix. After drying, the resulting material yielded the following strength tests, in psi measured at the indicated time intervals post drying:

7 days: 420 psi
14 days: 560 psi
28 days: 720 psi

EXAMPLE 19

A cementitious composition was prepared by mixing the following components under the following conditions:

3 parts v/v of C-type fly ash that has been de-limed.
1 part v/v F-type fly ash that has been de-limed.
9 parts v/v of Portland cement.
4 parts v/v of lime.
6 parts v/v play sand.
1 part Thermo-Shield® brand of water proofing additive
24 parts v/v of micronized polystyrene foam particles.

The above ingredients were dry mixed for five minutes, and 9 parts v/v of water were added to the mix. After drying, the resulting material yielded the following strength tests, in psi measured at the indicated time intervals post drying:

7 days: 840 psi
28 days: 1150 psi

EXAMPLE 20

A cementitious composition was prepared by mixing the following components under the following conditions:

3 parts v/v F-type fly ash that has been de-limed.
9 parts v/v of Portland cement.
3 parts v/v of lime.
6 parts v/v silica sand.
0.5 part Thermo-Shield® brand of water proofing additive
12 parts v/v of micronized polystyrene foam particles.
12 parts v/v of polystyrene foam beads.

The above ingredients were dry mixed for five minutes, and 9 parts v/v of water were added to the mix. After drying, the resulting material yielded the following strength tests, in psi measured at the indicated time intervals post drying:

7 days: 820 psi
18 days: 1030 psi

EXAMPLE 21

A cementitious composition is prepared by mixing the following components under the following conditions:

4 parts v/v F-type fly ash..
9 parts v/v of Portland cement.
6 parts v/v sand.
36 parts v/v of micronized polystyrene foam particles.
0.001 part v/v of air entrainment agent.
1 part v/v of Fibermesh® brand of Fiberglass reinforcement fiber The above ingredients are dry mixed for five minutes, and 9 parts v/v of water are added to the mix.

EXAMPLE 22

A cementitious composition is prepared by mixing the following components under the following conditions:

4 parts v/v F-type fly ash..
9 parts v/v of Portland cement.
6 parts v/v sand.
50 parts v/v of micronized polystyrene foam particles.
0.001 part v/v of air entrainment agent.
1 part v/v of Fibermesh® brand of fiberglass reinforcement Fiber.

The above ingredients are dry mixed for five minutes, and 9 parts v/v of water are added to the mix.

EXAMPLE 23

A cementitious composition is prepared by mixing the following components under the following conditions:

4 parts v/v F-type fly ash..
9 parts v/v of Portland cement.
6 parts v/v sand.
36 parts v/v of micronized polystyrene foam particles.
0.001 part v/v of air entrainment agent.
1 part v/v of Fibermesh® brand of fiberglass reinforcement Fiber.

The above ingredients are dry mixed for five minutes, and 10 parts v/v of water are added to the mix.

While the invention has been described and illustrated with reference to certain preferred embodiments thereof, those skilled in the art will appreciate that various changes, modifications and substitutions can be made therein without departing from the spirit and scope of the invention. It is intended, therefore, that the invention be limited only by the scope of the claims which follow and that such claims be interpreted as broadly as is reasonable.

What is claimed is:

1. A cementitious product comprising:
   (a) from 40 to 99% by volume of an aqueous cementitious mixture;
   (b) from 1 to 60% by volume of micronized polystyrene foam particles, wherein said polystyrene foam particles have an approximate density of about 1.0 lb/ft$^3$; and
   (c) a borate insect repellant.

2. The cementitious product as claimed in claim 1, wherein said micronized polystyrene foam particles have irregular surfaces.

3. The cementitious product as claimed in claim 1, wherein said micronized polystyrene foam particles are a coarse powder.

4. The cementitious product as claimed in claim 1, wherein said micronized polystyrene foam particles have an average diameter of approximately 1 to 5000 microns.

5. The cementitious product as claimed in claim 1, wherein said micronized polystyrene foam particles have an average diameter of approximately 50 to 2000 microns.

6. The cementitious product as claimed in claim 1, wherein said micronized polystyrene foam particles have an average diameter of approximately 600 to 1200 microns.

7. The cementitious product as claimed in claim 1, wherein said micronized polystyrene foam particles have an average diameter of approximately 800 microns.

8. The cementitious product as claimed in claim 1, wherein said aqueous cementitious mixture comprises a hydraulic cement.

9. The cementitious product as claimed in claim 1, wherein said aqueous cementitious mixture comprises a portland cement.

10. The cementitious product as claimed in claim 1, wherein said aqueous cementitious mixture comprises lime.

11. The cementitious product as claimed in claim 1, wherein said aqueous cementitious mixture comprises an air entrainment agent.

12. The cementitious product as claimed in claim 1, wherein said aqueous cementitious mixture comprises fly ash.

13. The cementitious product as claimed in claim 1, wherein said aqueous cementitious mixture comprises class C fly ash.

14. The cementitious product as claimed in claim 1, wherein said aqueous cementitious mixture comprises class F fly ash.

15. The cementitious product as claimed in claim 1, wherein said aqueous cementitious mixture comprises de-limed fly ash.

16. The cementitious product as claimed in claim 1, wherein said aqueous cementitious mixture comprises sand.

17. The cementitious product as claimed in claim 1, wherein said aqueous cementitious mixture comprises fiberglass reinforcing fibers.

18. A method of preparing a lightweight cementitious product comprising the steps of:
   (a) shredding polystyrene containing a borate insect repellant and having an approximate density of 1 lb/ft$^3$ to form micronized polystyrene foam particles;
   (b) forming a cementitious mixture suitable for undergoing a hydration reaction in the presence of water;
   (c) dispersing said foam particles into said cementitious mixture;
   (d) adding a sufficient quantity of water to cause a hydration reaction to take place in said cementitious mixture thus forming a final mixture; and
   (e) pouring the final mixture of step (d) into a mold.

19. A product as claimed in claim 1, wherein said product is a roof tile.

20. A product as claimed in claim 1, wherein said product is a building foundation wall.

21. A product as claimed in claim 1, wherein said product is a wall board product.

22. A product as claimed in claim 1, wherein said product is a paver.

23. A product as claimed in claim 1, wherein said product is a brick.

24. A product as claimed in claim 1, wherein said product is a fire brick.

25. A product as claimed in claim 1, wherein said product is a roof paver.

26. A product as claimed in claim 1, wherein said product is a block for landscape retaining walls.

27. A product as claimed in claim 1, wherein said product is a prestressed concrete wall.

28. A product as claimed in claim 1, wherein said product is a tilt-up wall.

29. The cementitious product as claimed in claim 1, wherein said aqueous cementitious mixture is present in a range of from 50 to 60% by volume and said micronized polystyrene foam particles are present in a range of from 40 to 50% by volume.

30. The cementitious product as claimed in claim 1, having a density of from 60 to 115 lb/ft$^3$.

31. The cementitious product as claimed in claim 1, having a density of from 70 to 90 lb/ft$^3$.

* * * * *